3,505,563
FLUID FUEL IGNITION COMBUSTION
ARRANGEMENT
Kenneth Barrington Randall and William Henry Maycock, Coventry, and Roger Thomas Hoffman, Rugby, England, assignors to Associated Electrical Industries Limited, London, England, a British company
Filed Feb. 28, 1966, Ser. No. 530,731
Claims priority, application Great Britain, Mar. 10, 1965, 10,198/65
Int. Cl. H05b 37/02, 39/04
U.S. Cl. 315—213
7 Claims

ABSTRACT OF THE DISCLOSURE

For fluid fuel combustion ignition several sparking plugs inside a combustion chamber are connected through respective spark gaps to a capacitor which is chargeable from a direct current source; the spark gaps have trigger electrodes and a common trigger control means is provided for positively determining the time relationship between the discharge instants at the several spark gaps.

---

This invention relates to an improved fluid fuel ignition combustion arrangement which is particularly advantageous to be used in conjunction with combustion chambers of gas turbines and jet engines.

Its primary object is to ensure adequate amounts of capacitor stored energy to be discharged at respective instants at a plurality of sparking plugs, while space and weight requirements are kept to an economical minimum.

Accordingly this invention resides in an ignition circuit arrangement comprising a number of spark plugs connected through a number of spark gaps, which have trigger electrodes, to a capacitor which is chargeable from a direct current source, wherein a common trigger control detemines the timing of the operation of at least two spark plugs by triggering the respective spark gaps.

The invention enables controlling the discharge sequence at individual sparking plugs with the aid of a selector switch which is rated at a lower voltage than the voltage of the sparking circuit.

The trigger electrode is positioned in the vicinity of the spark gap to cause in the region of the spark gap ionisation or distortion of the electric field when a trigger signal occurs. When the spark gap is sealed in an enclosure the trigger electrode may comprise a metal band or wire outside the enclosure, or a third electrode within the gap.

The trigger electrode can be coupled to a trigger signal producing control circuit through a transformer.

The trigger signal may be derived with the aid of a diode which breaks down at a predetermined forward voltage, or a triggered pulse generator or any equivalent means such as a unijunction transistor.

More details will become apparent and the invention will be better understood from the following description referring to the accompanying drawings, in which.

Figure 4:
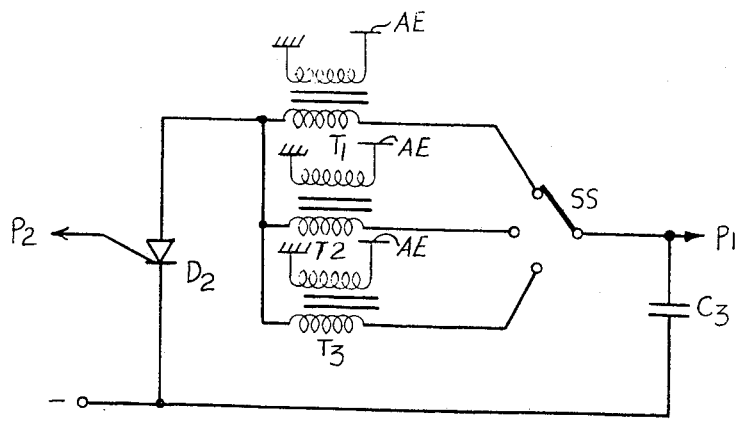
Figure 5:
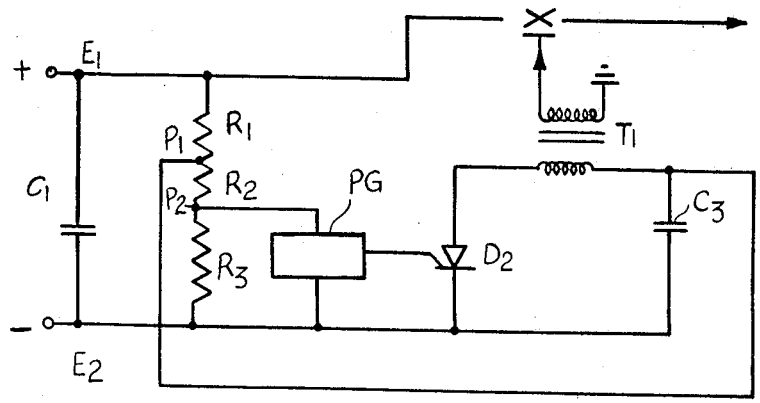
Figure 6:
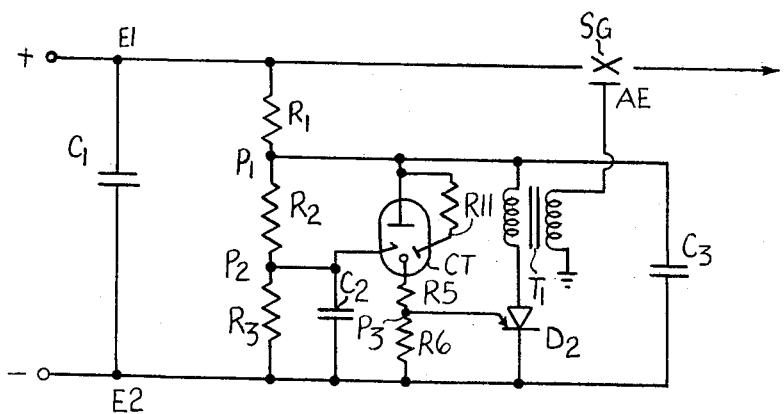
Figure 7:
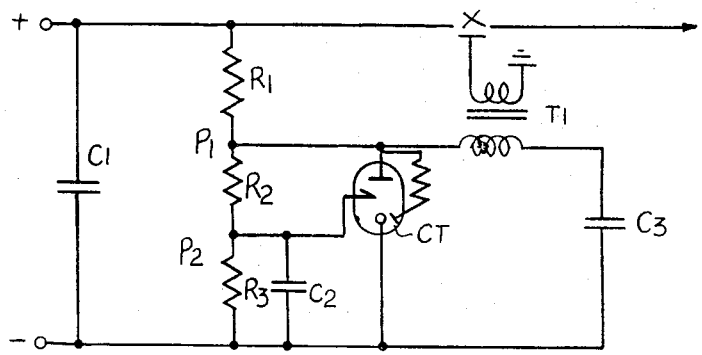
Figure 8:
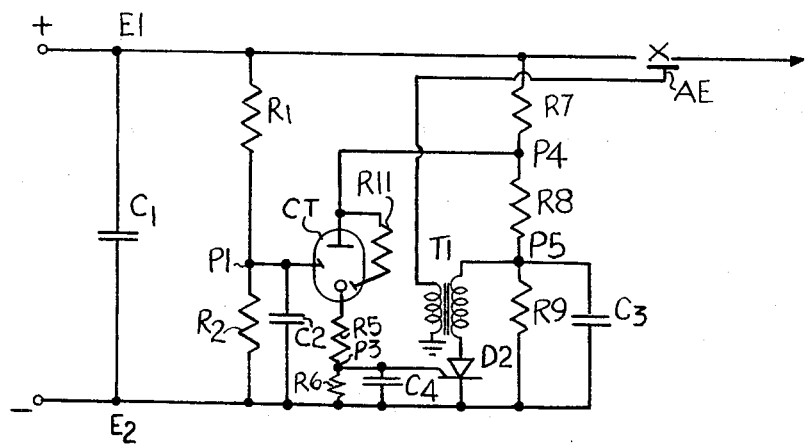

FIG. 4 shows how three transformers whose primary input is controlled by a distributor switch can be used to derive trigger signals from a common trigger circuit for controlling three sparking plugs, FIG. 5 shows in conjunction with one only of the several sparking plugs an embodiment using a control circuit of the Schmitt trigger kind that is a bistable pulse generator which produces an output voltage when a slowly rising input voltage attains a predetermined value, FIG. 6 shows a modification using a cold cathode tube for the same purpose, FIG. 7 shows a simplified modification of the FIG. 6 arrangement, FIG. 8 shows a modified arrangement of potential divider sections, which determine the voltages in the trigger and trigger control circuits.

Figure 9:
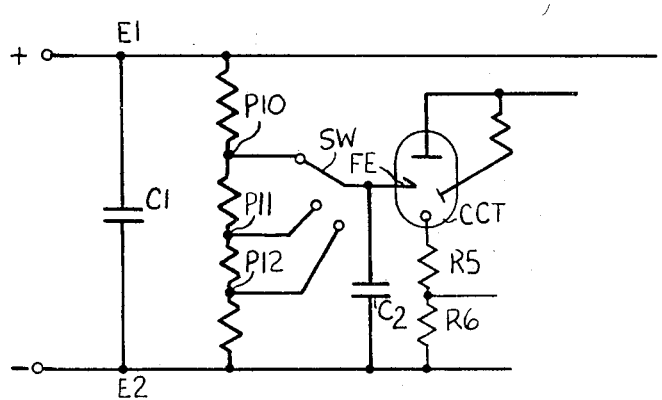
Figure 10:
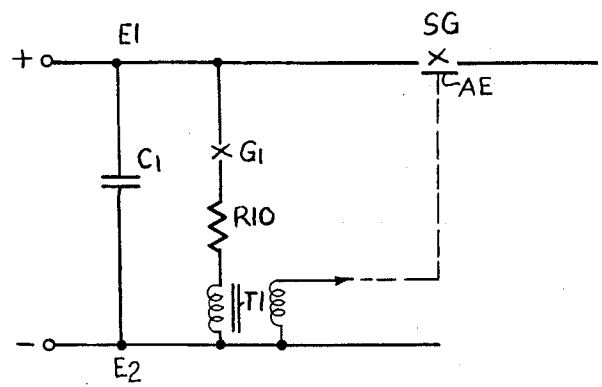
Figure 11:
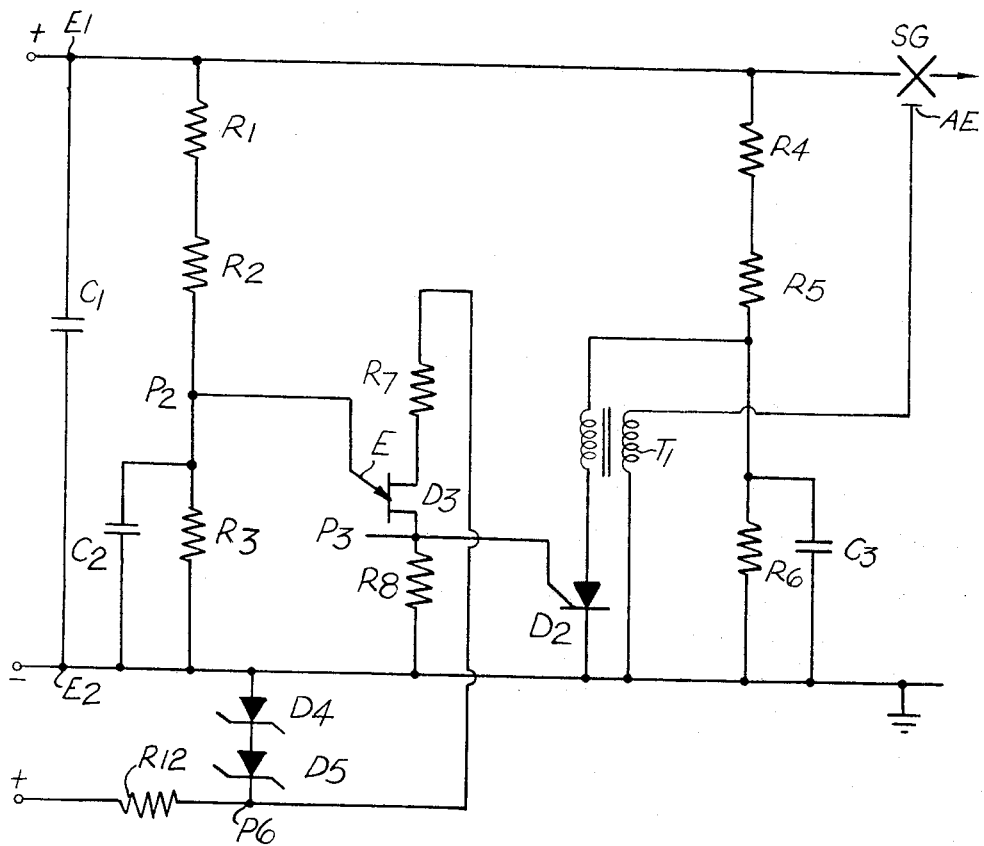

FIG. 9 shows a modification which allows a variation of the sparking energy,

FIG. 10 shows an arrangement in which a control spark gap serves for producing the trigger signal which strikes the spark gap which initiates the discharge at the sparking plug, and FIG. 11 shows a unijunction transistor acting as a "Schmitt" generator.

Similar reference characters denote similar parts in the various figures.

Figure 1:
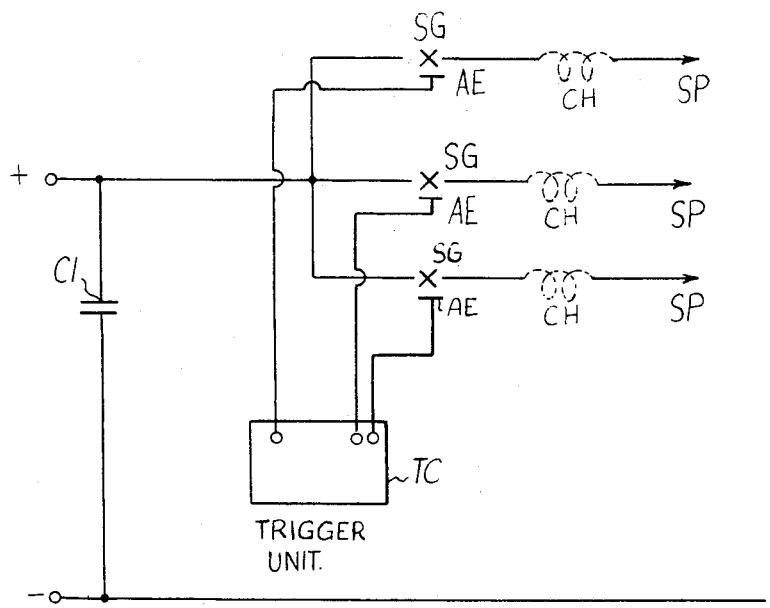
FIG. 1 shows diagrammatically the fundamental circuit according to the invention for three sparking plugs.

Referring to FIG. 1 a storage capacitor C1 is charged through terminals denoted +, −, from a direct current source such as a rectifier connected to an A.C. network, a battery and converter or a dynamo-electric generator driven by an electric motor or a prime mover. Three spark plugs indicated by arrows SP are connected through spark gaps SG to the storage capacitor. Trigger electrodes AE influence the spark gaps and receive signals from a trigger circuit TC which determines the instant of spark initiation at the spark gaps and thereby the capacitor discharge through the sparking plugs. A switching means or distributor means known per se can be provided to control the supply of trigger signals, in a predetermined sequence which may be repeated, as required for multiple combustion chambers, for instance. Chokes CH can be connected between the spark gaps and sparking plugs to limit the peak discharge current.

Figure 2:
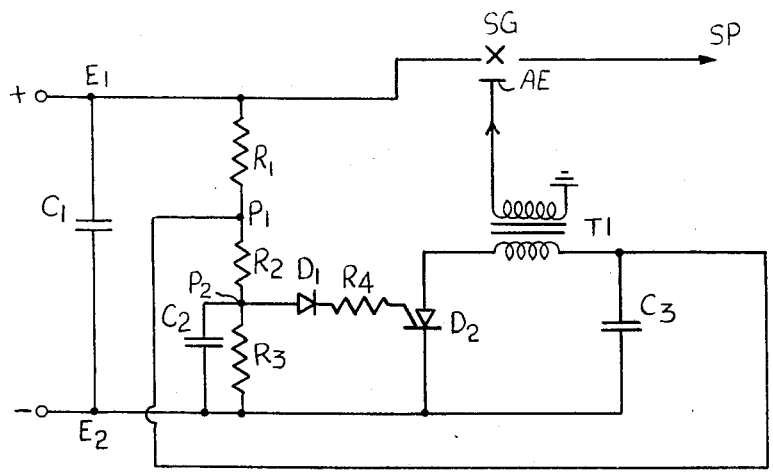
FIG. 2 shows in conjunction with one only of the several sparking plugs how a transformer and a Shockley diode can be used in the trigger circuit.

FIG. 2 includes details of a trigger signal producing circuit. The trigger electrode AE of the spark gap SG is connected to one end of the secondary winding of a trigger transformer T1 the other end of which is earthed. The primary winding of the trigger transformer forming part of a control circuit has one end connected to a point P1 between resistors R1, R2 and has the other end connected through a threshold switch, comprising here a controlled discharge device D2, particularly a silicon controlled rectifier, to the negative terminal. The control electrode of the device D2 is connected by an intermediate circuit to a point P2 between resistors R2, R3, through a resistor R4 and a second threshold switch formed here by a Shockley diode D1, such as a four layer device, which has a high forward resistance until a characteristic anode to cathode voltage is attained when the forward resistance is greatly reduced, i.e. the diode becomes conducting at a predetermined voltage. The resistors R1, R2, R3 form a voltage divider, between the points E1, E2, for the voltage at the D.C. supply terminals which corresponds to the voltage of the capacitor C1. A capacitor C2 is connected in shunt to the resistor R3, and a capacitor C3 is connected in shunt with a series circuit comprising the primary winding of transformer T1 and the silicon controlled rectifier D2.

The operation is as follows: as the capacitor C1 is charged up the voltage across the potential divider rises, and capacitors C2, C3 charge up accordingly. When the voltage of capacitor C1 attains a predetermined value say 2 kv. the voltage across capacitor C2 arrives at a predetermined break-over voltage at which the Shockley diode D1 becomes conducting. Capacitor C2 discharges through diode D1 and resistor R4 to apply a signal to the control electrode of the rectifier D2 which now becomes conducting to discharge capacitor C3 through the primary winding of transformer T1. A high voltage signal from the secondary winding of the transformer T1 is then applied to the auxiliary electrode AE of spark gap SG. In a particular example the break-over voltage of the Shockley diode D1 was 20 volts, and the capacitor C3 discharged at 200 volts.

Figure 3:
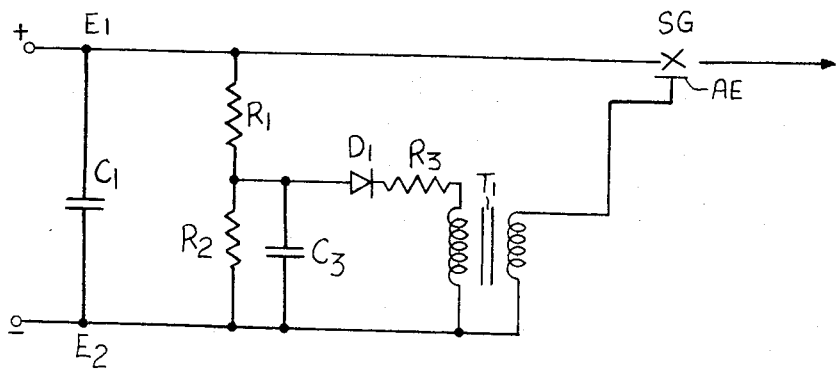
FIG. 3 shows a simplified modification of the arrangement according to FIG. 2.

If the Shockley diode is capable of carrying the current required in the primary winding of transformer T1 then the silicon controlled rectifier D2 can be dispensed with and the trigger signal can be controlled by the diode D1 in accordance with FIG. 3.

Where three spark plugs have to be supplied through three spark gaps the auxiliary electrodes of the spark gaps can be controlled by three transformers T1, T2, T3 as shown by FIG. 4. The primary windings of the three transformers T1, T2, T3 have each one end connected to the device D2 and the other end connected individually in series with the capacitor C3 through a selector switch SS. The selector switch SS may be manually controlled as in the case of multiple lifting jet engines, or may comprise a distributor device which is automatically controlled to cause sparking at several plugs in repeated succession.

In lieu of the diode D1 any equivalent means can be used, such as a pulse generating circuit of the Schmitt trigger kind, indicated at PG in FIG. 5. The function of capacitor C2 (of FIG. 2) is now included in the unit PG. As the voltage across the input rises to a predetermined value a pulse is produced which fires the silicon controlled rectifier D2.

In yet another embodiment illustrated by FIG. 6 the rectifier D2 is controlled by the output of a cold cathode tube CT which represents the threshold switch. The anode of the tube is connected to point P1, the cathode of the tube is connected in series with resistors R5, R6 to terminal E2 of capacitor C1. A point P3 between the resistors R6, R5 supplies the control electrode of the rectifier D2. A resistor R11 is connected between the anode and an auxiliary anode of the tube, and a firing electrode of the tube is connected to the point P2, a capacitor C2 being arranged in shunt with the resistor R3 as in FIG. 2. At a critical voltage, capacitor C2 causes the firing of the tube CT, and capacitor C3 supplies then through the tube CT a control signal which triggers the controlled rectifier D2 whereupon capacitor C3 fully discharges through D2 in series with the primary of the transformer T1, thus producing a trigger pulse at the auxiliary electrode AE of the spark gap SG.

The controlled rectifier D2 can be dispensed with if the cold cathode tube is sufficient to carry the discharge from capacitor C3. As FIG. 7 shows the tube CT is then connected in shunt with a series circuit comprising the primary winding of the transformer T1 and the capacitor C3. Two cold cathode tubes can be used one of which controls the firing of the other. Then the second tube, which is in series with capacitor C3, need not be very accurate as its firing is determined by the first tube. As the duty of the latter tube is comparatively light a high stability as required for uniform operation can readily be achieved.

Two voltage dividers can be used as indicated in FIG. 8. Resistors R1, R2 are connected in series across the capacitor electrodes E1, E2, to determine point P1 from which the voltage of the firing electrode of tube CT is derived. Another voltage divider comprises a chain of resistors R7, R8, R9, connected across capacitor C1. A point P4 between resistors R7, R8 is connected to the anode of the tube CT. Point P5 between resistors R8, R9 is connected to the primary of transformer T1 and to capacitor C3 so that the series circuit including the controlled rectifier D2 and the primary winding of transformer T1 is in parallel with the capacitor C3 at the voltage of P5. The control electrode of rectifier D2 is connected to point P3 between resistors R6, R5 (as in FIG. 6).

The arrangement according to FIG. 8 allows accurate voltage signals at the trigger electrode AE of the spark gap with resistors R1, R2 of a high stability type.

The quantity of energy discharged at the sparking plug can be controlled by varying the voltage at which capacitor C1 discharges, using for instance an embodiment as illustrated by FIG. 9. A voltage divider connected between terminals E1, E2 of the capacitor C1 has tapping points P10, P11, P12 alternatively connectible to the firing electrode FE of cold cathode tube CT, through a selector SW, to cause capacitor discharge at different voltage levels.

According to FIG. 10 a series circuit comprising the primary winding of transformer T1, a resistor R10 and an auxiliary spark gap G1 as a threshold switch is connected between the terminals E1, E2 of the capacitor C1. The auxiliary or control spark gap G1 serves here without a potentiometer, as the break-over voltage of the gap is set to a desired charge voltage of the capacitor C1. When the gap G1 fires a trigger voltage is applied to the electrode AE of gap SG.

FIGURE 11 shows an embodiment in which the control circuit includes a unijunction transistor functioning as a pulse generator of the Schmitt kind as a threshold switch. Here a unijunction transistor D3 has one of its two base contacts connected through a resistor R8 to the negative terminal, and has the other base contact connected through a resistor R7 to a postive voltage LV which is lower than the voltage HV at the other positive terminal. Preferably two Zener diodes D4, D5 maintain constant the unijunction bias, said diodes being connected in series between the negative terminal and a point P6 joining the resistors R7 to a resistor R12. The emitter E of the unijunction transistor D3 is connected to a point P2 between resistors R2, R3 of the voltage divider. As the bias of the unijunction transistor is maintained at a constant value, in the range between 16 and 28 volt for instance, the emitter peak point voltage at which the unijunction transistor becomes conducting is not influenced by fluctuation of the voltage at the D.C. terminals.

The operation is as follows:

As the capacitor C1 charges up and the voltage difference between points E1, E2 rises, predetermined portions of this voltage difference are applied to the emitter E and across the capacitors C2, C3. At a predetermined voltage the unijunction transistor becomes conducting and causes a discharge of the capacitor C2 which produces a voltage across the resistor R8. The gate or control electrode of the semiconductor rectifier D2, connected to a point P3 between the unijunction transistor and the resistor R8, makes the rectifier conducting at the desired instant to cause capacitor C3 to discharge through the rectifier D2 and thereby to trigger the electrode AE of the spark gap SG through the transformer T1.

The invention is particularly suitable to be used where the intervals between the sparks produced at the plugs are comparatively great, for instance in conjunction with a vertical lift aeroplane having several combustion chambers delivering several lifting jets furnished with individual sparking plugs.

What we claim is:

1. A fluid fuel combustion arrangement including a combustion chamber, a plurality of spark gaps each having two main electrodes and a trigger electrode, a first storage capacitor and a direct current source, the capacitor being connected across and charged from the direct current source, each of the spark gaps having one main electrode connected to a common point at one side of the first storage capacitor, each of the spark plugs being connected to the other main electrode of respective ones of the sprak gaps, means for triggering the spark gaps sequentially to discharge the first storage capacitor sequentially through the spark plugs, said means comprising a breakdown device, a second storage capacitor, a plurality of transformers each having a primary and a secondary winding, each of the secondary windings connected to a respective one of the trigger electrodes, one end of each primary winding connected to a common point at one side of said breakdown device, and distributor means to connect the breakdown device and the second storage capacitor in series sequentially with each of the primary windings, so that upon breakdown of the breakdown device the second storage capacitor is discharged sequentially through each primary winding.

2. An arrangement as claimed in claim 1 in which the breakdown device is a semiconductor device of a predetermined breakover voltage, said device being connected to the direct current source through a voltage divider.

3. An arrangement as claimed in claim 1 in which said means for triggering includes an unijunction transistor.

4. An arrangement as claimed in claim 1 in which the means for triggering includes a semiconductor device, said device has a control electrode, and said electrode is connected to the direct current source through a voltage divider.

5. An arrangement as claimed in claim 1 which includes a pulse generator in the primary circuit of the transformer.

6. An arrangement as claimed in claim 1 in which the means for triggering includes a cold cathode tube, said tube has a firing electrode, said electrode is connected in series wtih a capacitor to a voltage divider, and said voltage divider is supplied from the direct current source.

7. An arrangement as claimed in claim 1 characterized by a manual control means of the voltage value at which the first storage capacitor is caused to discharge.

References Cited

UNITED STATES PATENTS

| 2,811,672 | 10/1957 | Gilbert | 315—173 X |
| 3,100,479 | 8/1963 | Wood | 123—148 |
| 3,311,783 | 3/1967 | Gibbs et al. | 315—226 |
| 3,324,841 | 6/1967 | Kebbon et al. | 123—148 X |
| 3,417,306 | 12/1968 | Knak | 317—241 |
| 3,297,911 | 1/1967 | Quinn. | |
| 3,288,044 | 11/1966 | Bramer. | |
| 3,275,884 | 9/1966 | Segall et al. | 315—205 |
| 3,240,198 | 3/1966 | Loudon et al. | 315—209 |
| 3,189,789 | 6/1965 | Howell | 315—241 |
| 2,978,611 | 4/1961 | Segall | 315—183 |
| 2,700,120 | 1/1955 | Germeshausen | 315—232 |
| 2,624,831 | 1/1953 | Farber | 315—353 |
| 2,622,229 | 12/1952 | Lord | 315—353 |
| 2,478,907 | 8/1949 | Edgerton | 315—353 |

FOREIGN PATENTS

| 681,950 | 3/1964 | Canada. |
| 962,417 | 7/1964 | Great Britain. |

JOHN W. HUCKERT, Primary Examiner

J. R. SHEWMAKER, Assistant Examiner

U.S. Cl. X.R.

123—148; 315—213, 220, 223, 238, 241, 272, 273, 274, 275, 276, 209